(12) United States Patent
Smith et al.

(10) Patent No.: US 11,913,833 B2
(45) Date of Patent: Feb. 27, 2024

(54) OPTICAL DEVICE

(71) Applicant: VIAVI Solutions Inc., San Jose, CA (US)

(72) Inventors: Valton Smith, Novato, CA (US); William D. Houck, Santa Rosa, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 0 days.

(21) Appl. No.: 17/807,428

(22) Filed: Jun. 17, 2022

(65) Prior Publication Data

US 2022/0316946 A1    Oct. 6, 2022

Related U.S. Application Data

(63) Continuation of application No. 16/784,928, filed on Feb. 7, 2020, now Pat. No. 11,366,011.

(60) Provisional application No. 62/805,048, filed on Feb. 13, 2019.

(51) Int. Cl.
*G01J 3/02* (2006.01)
*G02B 1/11* (2015.01)
*G01J 3/28* (2006.01)

(52) U.S. Cl.
CPC .......... *G01J 3/0229* (2013.01); *G01J 3/2803* (2013.01); *G02B 1/11* (2013.01); *G01J 2003/2806* (2013.01)

(58) Field of Classification Search
CPC .............. G01J 3/0229; G01J 3/2803; G01J 2003/2806; G01J 2003/2826; G02B 1/11; G02B 5/201

USPC ........................................................ 356/419
See application file for complete search history.

(56) References Cited

U.S. PATENT DOCUMENTS

| 8,988,566 | B2 | 3/2015 | Wang et al. |
| 10,168,459 | B2 | 1/2019 | Ockenfuss |
| 10,651,216 | B2 | 5/2020 | Ockenfuss |
| 11,366,011 | B2 | 6/2022 | Smith et al. |
| 2004/0027652 | A1* | 2/2004 | Erdogan ................. G02B 5/285 359/359 |
| 2011/0036984 | A1* | 2/2011 | Zhang .................... G02B 1/118 250/340 |
| 2014/0084137 | A1* | 3/2014 | de Groot ........... H01L 27/14625 438/59 |

(Continued)

FOREIGN PATENT DOCUMENTS

| CN | 104457708 B | 7/2017 |
| EP | 3187910 A1 | 7/2017 |

(Continued)

OTHER PUBLICATIONS

International Search Report and Written Opinion for Application No. PCT/US2020/017497, dated Jun. 8, 2020, 21 pages.

*Primary Examiner* — Md M Rahman
(74) *Attorney, Agent, or Firm* — Harrity & Harrity, LLP

(57) ABSTRACT

An optical device may comprise an array of sensor elements and an array of optical channels disposed on the array of sensor elements. At least one optical channel of the array of optical channels may be configured to pass bandpass filtered light to at least one sensor element of the array of sensor elements. At least one other optical channel of the array of optical channels may be configured to pass non-bandpass filtered light to at least one other sensor element of the array of sensor elements.

20 Claims, 3 Drawing Sheets

(56) References Cited

U.S. PATENT DOCUMENTS

| | | | |
|---|---|---|---|
| 2017/0034456 A1 | 2/2017 | Kyung et al. | |
| 2017/0097451 A1 | 4/2017 | Kyoung | |
| 2019/0025483 A1* | 1/2019 | Switzer, III | G02B 5/285 |
| 2020/0193580 A1 | 6/2020 | McCall et al. | |
| 2021/0384242 A1* | 12/2021 | Ockenfuss | H01L 27/1464 |

FOREIGN PATENT DOCUMENTS

| | | |
|---|---|---|
| TW | 201407757 A | 2/2014 |
| TW | 201706224 A | 2/2017 |
| TW | 201734415 A | 10/2017 |
| TW | 201827867 A | 8/2018 |
| WO | 2012148918 A2 | 11/2012 |
| WO | 2012148919 A2 | 11/2012 |

* cited by examiner

OPTICAL DEVICE

RELATED APPLICATIONS

This application is a continuation of U.S. patent application Ser. No. 16/784,928, filed Feb. 7, 2020 (now U.S. Pat. No. 11,366,011), entitled "OPTICAL DEVICE," which claims priority to U.S. Provisional Patent Application No. 62/805,048, filed on Feb. 13, 2019, and entitled "MULTI-SPECTRAL SENSOR CONTAINING A BROADBAND TRANSPARENT COMPONENT," the contents of which are incorporated by reference herein in their entirety.

BACKGROUND

A multispectral sensor device may be utilized to capture information. For example, the multispectral sensor device may capture information relating to a set of electromagnetic frequencies. The multispectral sensor device may include a set of sensor elements (e.g., optical sensors, spectral sensors, and/or image sensors) that capture the information. For example, an array of sensor elements may be utilized to capture information relating to multiple frequencies. A particular sensor element, of the sensor element array, may be associated with a filter that restricts a range of frequencies that are directed toward the particular sensor element. The filter may be associated with a particular passband corresponding to a width of a spectral range that the filter passes toward the particular sensor element.

SUMMARY

According to some implementations, an optical device comprises an array of sensor elements and an array of optical channels disposed on the array of sensor elements, wherein at least one optical channel of the array of optical channels is configured to pass bandpass filtered light to at least one sensor element of the array of sensor elements, and wherein at least one other optical channel of the array of optical channels is configured to pass non-bandpass filtered light to at least one other sensor element of the array of sensor elements.

According to some implementations, a system comprises an array of sensor elements and a multispectral filter that is disposed on at least a portion of the array of sensor elements, configured to pass bandpass filtered light to at least one sensor element of the array of sensor elements, and pass non-bandpass filtered light to at least one other sensor element of the array of sensor elements.

According to some implementations, a multispectral filter comprises at least one bandpass filter component and at least one broadband transparent component, wherein the at least one bandpass filter component and the at least one broadband transparent component are configured to be disposed on a respective at least one sensor element of an array of sensor elements.

DETAILED DESCRIPTION

Figure 1:
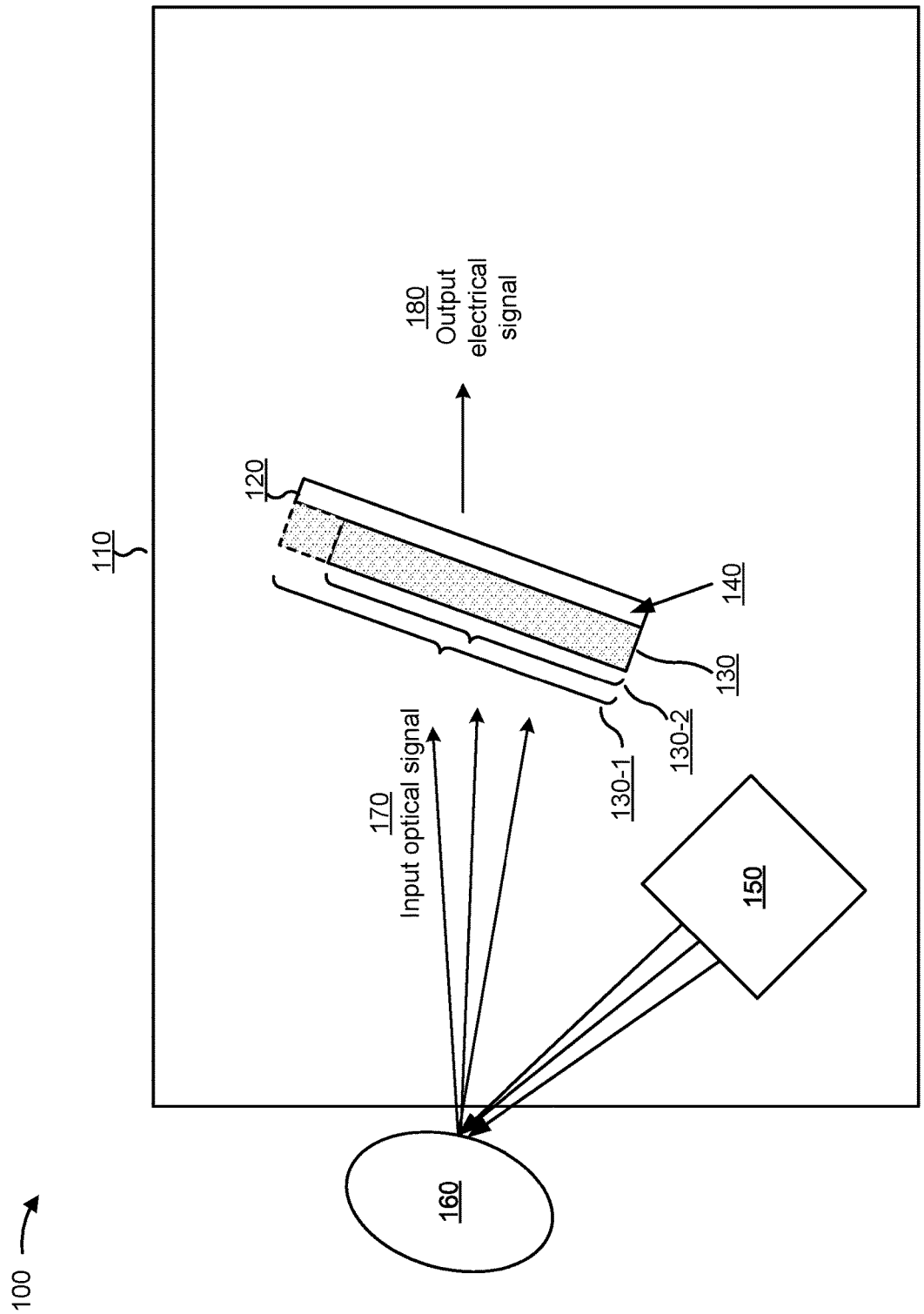
FIGS. 1-3 are diagrams of one or more example implementations described herein.

The following detailed description of example implementations refers to the accompanying drawings. The same reference numbers in different drawings may identify the same or similar elements.

An optical filter (e.g., a multispectral filter) may include a set of optical channels designed to transmit light in different wavelength ranges. For example, the set of optical channels may include discrete gratings or bandpass filters, each of which may be designed to pass light in a respective wavelength range. The optical filter may be included in an optical device, such as a multispectral sensor device, that includes a set of sensor elements (e.g., optical sensors) to capture spectral data relating to different wavelengths of light (based on wavelengths of light passed by the optical filter).

In many cases, each optical channel of the set of optical channels of the optical filter may be configured to pass bandpass filtered light (e.g., light of a particular spectral range, such as 2 to 10 nanometers wide). When broadband light (e.g., light with a wider spectral range than the particular spectral range, such as light that is greater than 10 nanometers wide) enters an optical channel, only light associated with the particular spectral range passes through the optical channel, and the remainder of the broadband light is blocked. Accordingly, only a small percentage of the broadband light (e.g., 0.5%) passes to a respective sensor element associated with the optical channel, which decreases an amount of optical power that reaches the respective sensor element.

When the amount of optical power that reaches a sensor element decreases, an acquisition integration time to obtain an optimal amount of energy increases (e.g., according to the formula $E = P \times T$, where E is an optimal amount of optical energy, P is an amount of optical power that reaches the sensor element, and T is an acquisition integration time). Accordingly, due to an increased acquisition integration time, a frame rate (e.g., to capture spectral data) of the sensor element may decrease. This may inhibit the sensor element's ability to obtain time-sensitive optical measurements for particular applications, such as optical health monitoring applications (e.g., heartbeat monitoring applications, blood pressure monitoring applications, and/or the like) that require an optical device to obtain 250 to 500 optical samples per second (sps).

Some implementations described herein provide an optical device that includes an array of optical channels disposed on an array of sensor elements. In some implementations, the array of optical channels may be included in a multispectral filter that is disposed on the array of sensor elements. In some implementations, the array of optical channels may be formed by one or more optical thin film coatings disposed on the array of sensor elements. In some implementations, at least one optical channel of the array of optical channels is configured to pass bandpass filtered light to at least one sensor element of the array of sensor elements and at least one other optical channel of the array of optical channels is configured to pass non-bandpass filtered light to at least one other sensor element of the array of sensor elements. In some implementations, the at least one optical channel includes a bandpass filter and/or the at least one other optical channel is a broadband transparent channel (e.g., a channel that passes non-bandpass filtered light). Additionally, or alternatively, in some implementations, the array of optical channels may be disposed in a broadband transparent substrate that is configured to pass non-bandpass filtered light to at least one sensor element of the array of sensor elements.

In this way, by including at least one broadband transparent component (e.g., a broadband transparent channel, a broadband transparent substrate, and/or the like), some implementations described herein allow a greater amount of optical power to reach at least one sensor element of an array of sensor elements than would otherwise be allowed when not using a broadband transparent component. This may decrease an acquisition integration time to obtain an optimal optical energy associated with the at least one sensor element, which may increase a frame rate of the at least one sensor element. This may enable the optical device to support time-sensitive applications. Furthermore, the optical device may also include at least one optical channel to pass bandpass filtered light, which may enable the optical device to also support applications that rely on spectral information.

FIG. 1 is a diagram of an example implementation 100 described herein. As shown in FIG. 1, example implementation 100 includes a sensor system 110. Sensor system 110 may be a portion of an optical system (e.g., an optical device), and may provide an electrical output corresponding to a sensor determination. For example, sensor system 110 may be a portion of a biometric system, a security system, a health monitoring system, an object identification system, a spectroscopic identification system, an imaging system, and/or the like. Sensor system 110 includes an optical filter structure 120, which includes an optical filter 130, and an array of sensor elements 140 (e.g., a set of optical sensors). For example, optical filter structure 120 may include an optical filter 130 that is configured to pass bandpass filtered light (e.g., light of a particular spectral range, such as 2 to 10 nanometers wide) to at least one sensor element of the array of sensor elements 140 and/or pass non bandpass filtered light (e.g., light with a wider spectral range than the particular spectral range, such as light that is greater than 10 nanometers wide) to at least one other sensor element of the array of sensor elements 140.

In some implementations, optical filter 130 may be a multispectral filter (e.g., that includes an array of optical channels), such as a multispectral filter coupled to a multispectral sensor (e.g., the array of sensor elements 140). As shown by reference number 130-1, the optical filter 130 may be coextensive with the array of sensor elements 140 (e.g., a face of the optical filter 130 may be aligned with a face of the array of sensor elements 140). As shown by reference number 130-2, the optical filter 130 may be coextensive with a portion of the array of sensor elements 140 (e.g., a face of the optical filter 130 may be aligned with a portion of the array of sensor elements 140). For example, the optical filter 130 may cover a first quantity of sensor elements, of the array of sensor elements 140, and may leave a second quantity of sensor elements uncovered.

Sensor system 110 includes an optical transmitter 150 (e.g., a light source) that transmits an optical signal toward a target 160 (e.g., a person, a finger of the person, an object, and/or the like). The optical signal may include broadband light, such as blackbody broadband light, emitted by the optical transmitter 150, and ambient light from the environment in which sensor system 110 is being utilized. In some implementations, sensor system 110 may perform sensing without using an optical transmitter 150 to transmit an optical signal toward a target 160. As shown by reference number 170, the optical signal is directed toward the optical filter structure 120. For example, optical transmitter 150 may direct an optical signal that comprises multiple wavelength ranges of visible light, near-infrared light, mid-infrared light, and/or the like toward an object (e.g., the target 160) and the optical signal may be reflected off the object toward the optical filter structure 120 to permit at least one sensor element of the array of sensor elements 140 to perform a measurement of light associated with a particular spectral range of the optical signal and/or to permit at least one other sensor element of the array of sensor elements 140 to perform a measurement of the broadband light associated with the optical signal. In some implementations, at least a portion of the optical signal is passed by the optical filter 130 to the array of sensor elements 140.

As further shown in FIG. 1, and by reference number 180, based on the at least a portion of the optical signal being passed to the array of sensor elements 140, the array of sensor elements 140 may provide an output electrical signal for sensor system 110, such as for use in performing a multispectral measurement, recognizing a gesture of the user, detecting the presence of an object, and/or the like.

As indicated above, FIG. 1 is provided merely as an example. Other examples are possible and may differ from what is described with regard to FIG. 1.

Figure 2:
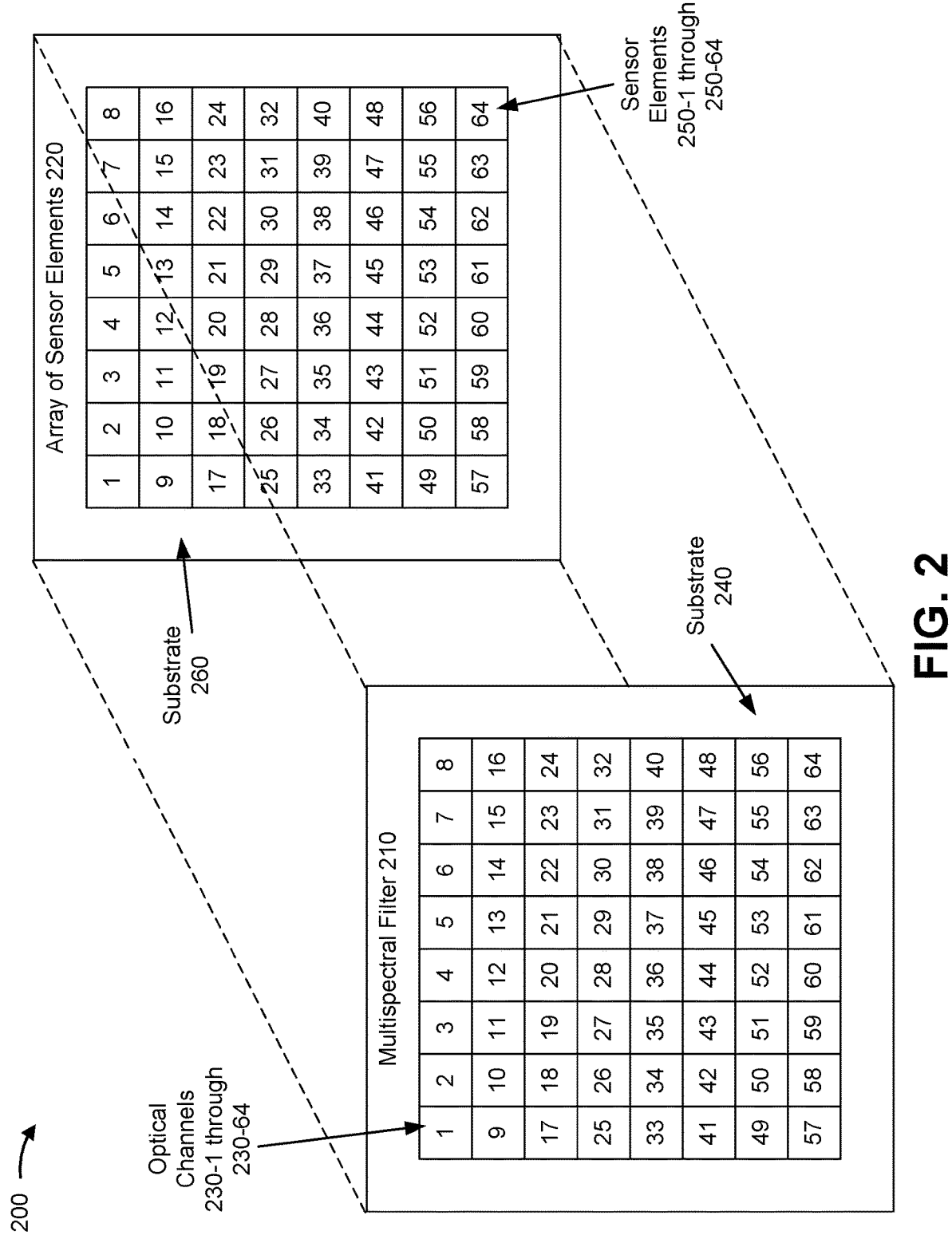

FIG. 2 is a diagram of an example implementation 200 described herein. As shown in FIG. 2, example implementation 200 includes a multispectral filter 210 and an array of sensor elements 220. The multispectral filter 210 may include one or more optical channels 230. As shown in FIG. 2, the multispectral filter 210 may include optical channels 230-1 through 230-64, but contemplated implementations include any number of optical channels 230. The one or more optical channels 230 may be included in (e.g., formed in) a substrate 240 (e.g., a glass substrate) of the multispectral filter 210. The one or more optical channels 230 may comprise a first area of the substrate 240 such that a second area of the substrate 240 (e.g., resembling a frame, a bezel, and/or the like of the multispectral filter 210 as shown in FIG. 2) does not include any optical channel.

The array of sensor elements 220 may include one or more sensor elements 250. As shown in FIG. 2, the array of sensor elements 220 may include sensor elements 250-1 through 250-64, but contemplated implementations include any number of sensor elements 250. The one or more sensor elements 250 may be included in (e.g., formed in) a substrate 260 (e.g., a glass substrate) of the array of sensor elements 220. The one or more sensor elements 250 may comprise a first area of the substrate 260 such that a second area of the substrate 260 (e.g., resembling a frame, a bezel, and/or the like of the array of sensor elements 220 as shown in FIG. 2) does not include any sensor element.

As indicated by the dashed lines in FIG. 2, the multispectral filter 210 may be disposed on the array of sensor elements 220. For example, a face of the multispectral filter 210 may be attached to a face of the array of sensor elements 220 such that the multispectral filter 210 and the array of sensor elements 220 are coextensive. Additionally, or alternatively, the multispectral filter 210 may be disposed on the array of sensor elements 220 such that the one or more optical channels 230 respectively correspond to the one or more sensor elements 250. For example, a face of the multispectral filter 210 may be disposed on a face of the array of sensor elements 220 such that optical channels 230-1 through 230-64 respectively align with sensor elements 250-1 through 250-64.

In some implementations, at least one optical channel of the one or more optical channels 230 (e.g., optical channel 230-1, optical channel 230-2, and/or the like) may be configured to pass bandpass filtered light (e.g., pass filtered broadband light, light of a particular spectral range, such as 2 to 10 nanometers wide, and/or the like) to at least one sensor element of the one or more sensor elements (e.g., sensor element 250-1, sensor element 250-2, and/or the like). For example, the at least one optical channel may include a bandpass filter (e.g., the at least one optical channel may include a bandpass filter coating) to filter out light of the optical signal (e.g., that is generated by the optical transmitter 150) that is not associated with a particular spectral range.

In some implementations, at least one other optical channel of the one or more optical channels 230 (e.g., any optical channel not configured to pass only bandpass filtered light) may be configured to pass non-bandpass filtered light to at least one other sensor element of the one or more sensor elements 250 (e.g., any sensor element not associated with an optical channel that passes bandpass filtered light). Accordingly, the at least one other optical channel may not include a bandpass filter (e.g., may not include a bandpass filter coating).

In some implementations, the at least one other optical channel may be a broadband transparent channel (e.g., that passes non-bandpass filtered light). For example, the at least one other optical channel may allow the optical signal (e.g., that comprises broadband light) that enters the at least one other optical channel to pass unfiltered through the at least one optical channel. Additionally, or alternatively, the at least one other optical channel may allow a broadband light portion (e.g., of the broadband light that comprises the optical signal) to pass through the at least one other optical channel. For example, when the broadband light of the optical signal includes visible light, near-infrared light, mid-infrared light, and/or the like, the at least one other optical channel may allow only visible light (e.g., a broadband light portion of the broadband light) to pass through the at least one other optical channel. As another example, when the broadband light of the optical signal includes visible light, the at least one other optical channel may allow only blue light, red light, green light, and/or the like to pass through the at least one other optical channel.

The at least one other optical channel may include a broadband transparent coating to allow the non-bandpass filtered light to pass through the at least one other optical channel. In some implementations, the at least one other optical channel may include a light enhancing element (e.g., to increase an amount of the non-bandpass filtered light that passes through the at least one other optical channel). For example, the at least one other optical channel may include an anti-reflection coating.

In some implementations, two or more optical channels of the optical channels 230 may be broadband transparent channels. Each broadband transparent channel may have a respective optical density level (e.g., each broadband transparent channel may have a different amount of grey-scale). This may enable at least one sensor element of two or more sensor elements of the sensor elements 250, which are respectively associated with the two or more optical channels, to obtain a particular amount of optical power from the optical signal. This may facilitate the at least one sensor element obtaining an optimal amount of optical energy when an acquisition integration time is fixed (e.g., for particular health monitoring applications).

For example, in a heart rate monitoring application (e.g., where the two or more sensor elements are to measure an amount of light that transmits through a subject's skin), a first broadband transparent channel with a first optical density level may be used to pass first non-bandpass filtered light associated with a heart rate measurement of a first subject with dark skin to a first sensor element and a second broadband transparent channel with a second optical density level may be used to pass non-bandpass filtered light associated with a heart rate measurement of a second subject with light skin to a second sensor element. The first optical density level may be less than the second optical density level (e.g., because less broadband light may transmit through the first subject's skin than may transmit through the second subject's skin), which may enable an amount of optical power of the first non-bandpass filtered light to be the same as or similar to the optical power of the first non-bandpass filtered light. Accordingly, a constant acquisition integration time, a constant frame rate, and/or the like may be used to obtain an optimal amount of optical energy to determine a respective heart rate measurement of the first subject and the second subject.

As indicated above, FIG. 2 is provided merely as an example. Other examples are possible and may differ from what is described with regard to FIG. 2.

Figure 3:
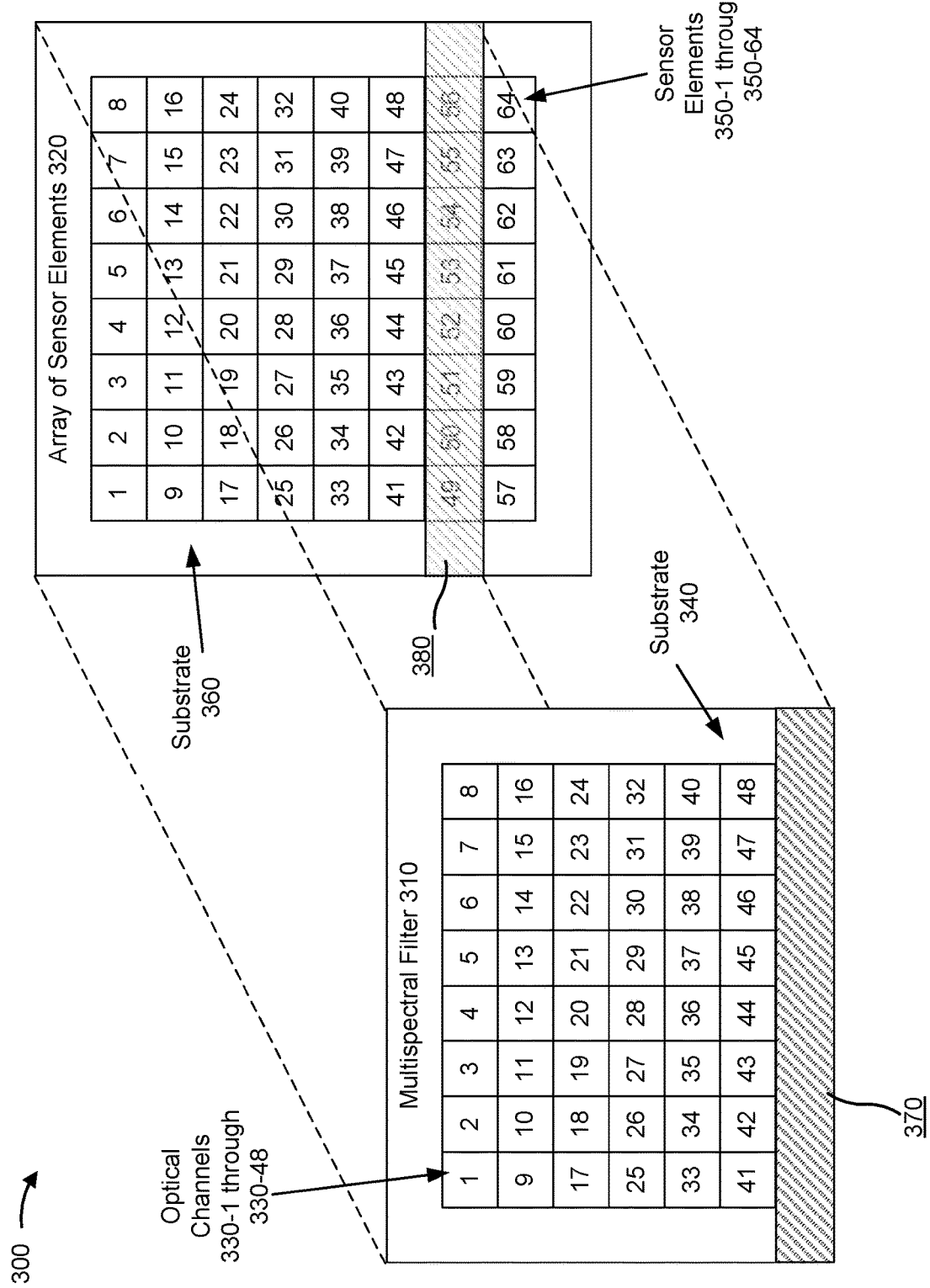

FIG. 3 is a diagram of an example implementation 300 described herein. As shown in FIG. 3, example implementation 300 includes a multispectral filter 310 and an array of sensor elements 320. The multispectral filter 310 may include one or more optical channels 330. As shown in FIG. 3, the multispectral filter 310 may include optical channels 330-1 through 330-48, but contemplated implementations include any number of optical channels 330. The one or more optical channels 330 may be included in (e.g., formed in) a substrate 340 (e.g., a glass substrate) of the multispectral filter 310. The one or more optical channels 330 may comprise a first area of the substrate 340 such that a second area of the substrate 340 (e.g., resembling a frame, a bezel, and/or the like of the multispectral filter 310 as shown in FIG. 3) does not include any optical channel.

The array of sensor elements 320 may include one or more sensor elements 350. As shown in FIG. 3, the array of sensor elements 320 may include sensor elements 350-1 through 350-64, but contemplated implementations include any number of sensor elements 350. The one or more sensor elements 350 may be included in (e.g., formed in) a substrate 360 (e.g., a glass substrate) of the array of sensor elements 320. The one or more sensor elements 350 may comprise a first area of the substrate 360 such that a second area of the substrate 360 (e.g., resembling a frame, a bezel, and/or the like of the array of sensor elements 320 as shown in FIG. 3) does not include any sensor element.

As indicated by the dashed lines in FIG. 3, the multispectral filter 310 may be disposed on a portion of the array of sensor elements 320 such that the one or more optical channels 330 respectively correspond to a portion of the one or more sensor elements 350. For example, a face of the multispectral filter 310 may be disposed on a face of the array of sensor elements 320 such that optical channels 330-1 through 330-48 respectively align with sensor elements 340-1 through 340-48. Accordingly, sensor elements 340-49 through 340-64 may not be associated with an optical channel of the one or more optical channels 330 (e.g., a quantity of the one or more sensor elements 350 is greater than a quantity of the one or more optical channels 330).

In some implementations, each optical channel of the one or more optical channels 330 may be configured to pass bandpass filtered light (e.g., pass filtered broadband light, light of a particular spectral range, such as 2 to 10 nanometers wide, and/or the like) to at least one sensor element of the one or more sensor elements 350 (e.g., in a similar manner as described herein in relation to FIG. 2). For example, each optical channel may include a bandpass filter (e.g., each optical channel may include a bandpass filter coating) associated with a respective spectral range.

In some implementations, the substrate 340 of the multispectral filter 310 may be broadband transparent (e.g., the substrate 340 may be configured to allow non-bandpass filtered light (e.g., light with a wider spectral range than the particular spectral range, such as light that is greater than 10 nanometers wide) to pass through the substrate 340. The substrate 340 may be disposed on at least one sensor element of the one or more sensor elements 350. For example, as shown in FIG. 3, an area 370 of the substrate 340 (e.g., a portion of the substrate 340) may be disposed on an area 380 of the array of sensor elements 320 (e.g., a portion of the array of sensor elements 320) that includes a set of sensor elements (e.g., sensor elements 350-49 through 350-56). In this way, because the area 370 of the substrate 340 is disposed on the set of sensor elements associated with the area 380 of the array of sensor elements 320, the substrate 340 may be configured to pass non-bandpass filtered light to the set of sensor elements associated with the area 380 of the array of sensor elements 320 (e.g., in a similar manner as described herein in relation to FIG. 2). In some implementations, the area 370 of the substrate 340 may include one or more sections where each section has a different respective optical density level. The one or more sections of the area 370 of the substrate 340 may respectively align with the set of sensor elements associated with the area 380 of the array of sensor elements 320.

Additionally, or alternatively, the multispectral filter 310 may not cover an additional set of sensor elements of the one or more sensor elements 350. For example, as shown in FIG. 3, the multispectral filter 310 covers the sensor elements 350-1 through 350-56 (e.g. the optical channels 330-1 through 330-48 and/or the substrate 340 are disposed on the array of sensor elements 320 to cover the sensor elements 350-1 through 350-56), but does not cover the additional set of sensor elements 350-57 through 350-64. In this way, the broadband light of the optical signal may directly enter the additional set of sensor elements without being filtered, passed, and/or the like by the multispectral filter 310. Additionally, or alternatively, a respective anti-reflection coating, a respective broadband transparent coating, and/or the like may be disposed on each sensor element of the additional set of sensor elements (e.g., an anti-reflection coating, a broadband transparent coating, and/or the like may be directly disposed on each sensor element).

As indicated above, FIG. 3 is provided merely as an example. Other examples are possible and may differ from what is described with regard to FIG. 3.

While some implementations described herein are directed to an array of optical channels (e.g., one or more optical channels 230 and/or one or more optical channels 330) that are included in a multispectral filter (e.g., multispectral filter 210 and/or multispectral filter 310) that is disposed on an array of sensor elements (e.g., array of sensor elements 220 and/or array of sensor elements 320), the array of optical channels may be disposed directly on the array of sensor elements (e.g., without a multispectral filter). For example, the array of optical channels may be formed by one or more optical thin film coatings (e.g., one or more bandpass coatings, one or more broadband transparent coatings, one or more anti-reflection coatings, and/or the like) disposed on the array of sensor elements. The array of optical channels may have the same or similar configurations as described herein (e.g., in relation to FIGS. 1-3). For example, at least one optical channel of the array of optical channels may be configured to pass bandpass filtered light to at least one sensor element of the array of sensor elements, as described herein. As another example, at least one other optical channel of the array of optical channels may be configured to pass non-bandpass filtered light to at least one other sensor element of the array of sensor elements, as described herein.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, a component, channel, coating, and/or the like may be "broadband transparent" when broadband light passes without being bandpass filtered by the component, the channel, the coating, and/or the like (e.g., when broadband light passes unfiltered through the component, the channel, the coating, and/or the like; when a broadband light portion of broadband light passes through the component, the channel, the coating, and/or the like; and/or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:
1. An optical device comprising:
   an array of sensor elements; and
   an array of optical components including a bandpass filter component, a first broadband transparent component, and a second broadband transparent component,
   wherein the bandpass filter component has a bandpass filter coating,
   wherein the first broadband transparent component includes an anti-reflection coating and does not include a bandpass filter coating,
   wherein the first broadband transparent component has a first optical density level and is configured to pass first non-bandpass filtered light to a first sensor element of the array of sensor elements, and
   wherein the second broadband transparent component has a second optical density level, different than the first optical density level, and is configured to pass second non-bandpass filtered light to a second sensor element of the array of sensor elements.

2. The optical device of claim 1, wherein the array of optical components is coextensive with the array of sensor elements.

3. The optical device of claim 1,
wherein the second broadband transparent component does not include a bandpass filter coating.

4. The optical device of claim 1,
wherein the second broadband transparent component includes an anti-reflection coating and does not include a bandpass filter coating.

5. The optical device of claim 1,
wherein the first broadband transparent component further includes a broadband transparent coating.

6. The optical device of claim 1, wherein the first broadband transparent component is a broadband transparent channel.

7. The optical device of claim 1, wherein
the array of sensor elements comprises a first quantity of sensor elements, and
the array of optical components comprises a second quantity of optical components that is less than the first quantity.

8. A system, comprising:
an array of sensor elements; and
a multispectral filter including a bandpass filter component, a first broadband transparent component, and a second broadband transparent component,
wherein the bandpass filter component has a bandpass filter coating,
wherein the first broadband transparent component includes an anti-reflection coating and does not include a bandpass filter coating,
wherein the first broadband transparent component has a first optical density level and is configured to pass first non-bandpass filtered light to a first sensor element of the array of sensor elements, and
wherein the second broadband transparent component has a second optical density level, different than the first optical density level, and is configured to pass second non-bandpass filtered light to a second sensor element of the array of sensor elements.

9. The system of claim 8, wherein
the multispectral filter includes a quantity of optical components that corresponds to a quantity of sensor elements in the array of sensor elements, and
the quantity of optical components includes the bandpass filter component, the first broadband transparent component, and the second broadband transparent component.

10. The system of claim 8, wherein the first broadband transparent component is a broadband transparent channel.

11. The system of claim 8,
wherein the second broadband transparent component does not include a bandpass filter coating.

12. The system of claim 8,
wherein the second broadband transparent component includes an anti-reflection coating.

13. The system of claim 8, wherein the first broadband transparent component is a portion of a substrate.

14. The system of claim 8, wherein the second broadband transparent component includes an anti-reflection coating and does not include a bandpass filter coating.

15. A multispectral filter, comprising:
a bandpass filter component having a bandpass filter coating,
a first broadband transparent component having a first optical density level and is configured to pass first non-bandpass filtered light to a first sensor element of an array of sensor elements,
wherein the first broadband transparent component includes an anti-reflection coating and does not include a bandpass filter coating; and
a second broadband transparent component having a second optical density level, different than the first optical density level, and is configured to pass second non-bandpass filtered light to a second sensor element of the array of sensor elements.

16. The multispectral filter of claim 15, wherein the first broadband transparent component further comprises at least one of:
a portion of a substrate, or
a broadband transparent coating.

17. The multispectral filter of claim 15, wherein the first non-bandpass filtered light includes light within a spectral range that is greater than approximately 10 nanometers.

18. The multispectral filter of claim 15,
wherein the bandpass filter component is configured to pass bandpass filtered light to a third sensor element of the array of sensor elements.

19. The multispectral filter of claim 18, wherein the bandpass filtered light includes light within a spectral range of approximately 2 nanometers to approximately 10 nanometers.

20. The multispectral filter of claim 18, wherein a spectral range of the first non-bandpass filtered light is wider than a spectral range of the bandpass filtered light.

* * * * *